(12) United States Patent
Sternberger et al.

(10) Patent No.: US 8,863,893 B2
(45) Date of Patent: Oct. 21, 2014

(54) ENGINE INLET VARYING IMPEDANCE ACOUSTIC LINER SECTION

(71) Applicant: Spirit AeroSystems, Inc., Wichita, KS (US)

(72) Inventors: Joe Everet Sternberger, Wichita, KS (US); Judith Marie Gallman, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 81 days.

(21) Appl. No.: 13/655,911

(22) Filed: Oct. 19, 2012

(65) Prior Publication Data

US 2013/0126265 A1     May 23, 2013

Related U.S. Application Data

(60) Provisional application No. 61/560,997, filed on Nov. 17, 2011.

(51) Int. Cl.
| | |
|---|---|
| *B64D 33/02* | (2006.01) |
| *F02K 1/00* | (2006.01) |
| *F02K 1/82* | (2006.01) |
| *E04B 1/82* | (2006.01) |
| *B64C 1/40* | (2006.01) |
| *B64C 23/00* | (2006.01) |
| *F01K 1/00* | (2006.01) |
| *F01N 1/00* | (2006.01) |
| *B64D 29/00* | (2006.01) |

(52) U.S. Cl.
CPC . *B64D 33/02* (2013.01); *F01K 1/00* (2013.01); *F01N 1/00* (2013.01); *B64D 29/00* (2013.01); *B64D 2033/0206* (2013.01)

USPC ........... 181/214; 181/213; 181/286; 181/292; 244/1 N

(58) Field of Classification Search
CPC .......... B64D 33/02; B64D 29/00; F01N 1/00; F02K 1/00
USPC ......................................... 181/214, 213, 292
See application file for complete search history.

(56) References Cited

U.S. PATENT DOCUMENTS

| | | | | |
|---|---|---|---|---|
| 3,972,383 | A * | 8/1976 | Green | 181/286 |
| 4,091,892 | A * | 5/1978 | Hehmann et al. | 181/286 |
| 4,235,303 | A * | 11/1980 | Dhoore et al. | 181/214 |
| 4,298,090 | A | 11/1981 | Chapman | |
| 4,421,201 | A * | 12/1983 | Nelsen et al. | 181/214 |
| 5,041,323 | A * | 8/1991 | Rose et al. | 428/116 |
| 6,358,590 | B1 | 3/2002 | Blair et al. | |
| 6,360,844 | B2 | 3/2002 | Hogeboom et al. | |

(Continued)

*Primary Examiner* — David Warren
*Assistant Examiner* — Christina Russell
(74) *Attorney, Agent, or Firm* — Hovey Williams LLP

(57) ABSTRACT

An inlet for an aircraft engine nacelle having an acoustic barrel panel, a septum buried or sandwiched within the acoustic barrel panel, and a perforated face sheet. The inlet may be located forward of an engine and/or an engine fan housed within the aircraft engine nacelle. Both the septum and the perforated face sheet may have perforations or holes therein of varying sizes and varying distances apart from each other. The smaller the area of the perforations or holes and the further apart they are from each other, the higher the impedance of a given area of the septum or the perforated face sheet. The impedance of the septum and/or the perforated face sheet may progressively increase in a direction away from the engine fan.

10 Claims, 3 Drawing Sheets

(56) References Cited

U.S. PATENT DOCUMENTS

| | | | |
|---|---|---|---|
| 6,557,799 B1 * | 5/2003 | Sternberger | 244/110 B |
| 6,609,592 B2 | 8/2003 | Wilson | |
| 6,619,913 B2 * | 9/2003 | Czachor et al. | 415/119 |
| 7,857,093 B2 | 12/2010 | Sternberger et al. | |
| 7,923,668 B2 * | 4/2011 | Layland et al. | 219/535 |
| 7,963,362 B2 | 6/2011 | Lidoine | |
| 7,998,389 B2 * | 8/2011 | Burchett et al. | 264/251 |
| 2004/0163888 A1 * | 8/2004 | Johnson | 181/292 |
| 2006/0169532 A1 * | 8/2006 | Patrick | 181/210 |
| 2008/0017442 A1 * | 1/2008 | Douglas | 181/213 |
| 2008/0135329 A1 * | 6/2008 | Strunk et al. | 181/214 |
| 2008/0251315 A1 * | 10/2008 | Ayle | 181/292 |
| 2009/0025860 A1 * | 1/2009 | Midali et al. | 156/182 |
| 2009/0277153 A1 | 11/2009 | Harper et al. | |
| 2010/0236862 A1 * | 9/2010 | Sternberger et al. | 181/213 |
| 2011/0244150 A1 * | 10/2011 | Thrash et al. | 428/34.1 |
| 2012/0037449 A1 * | 2/2012 | Ayle | 181/292 |
| 2013/0075193 A1 * | 3/2013 | Vavalle | 181/284 |

\* cited by examiner

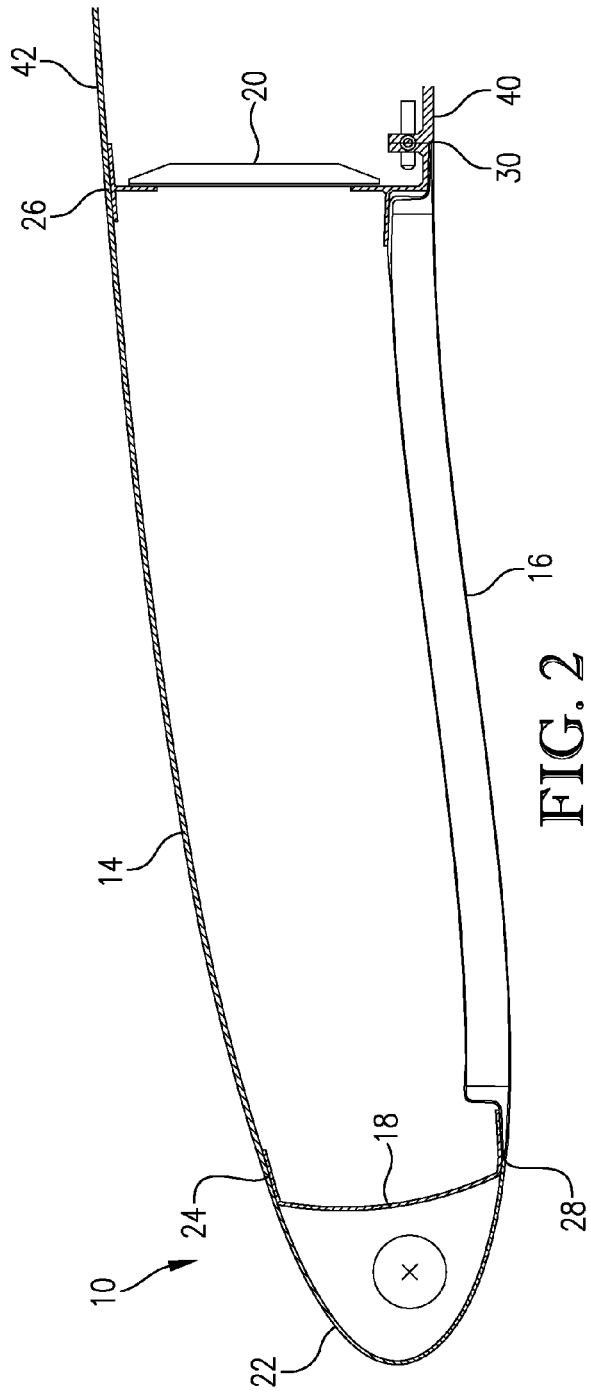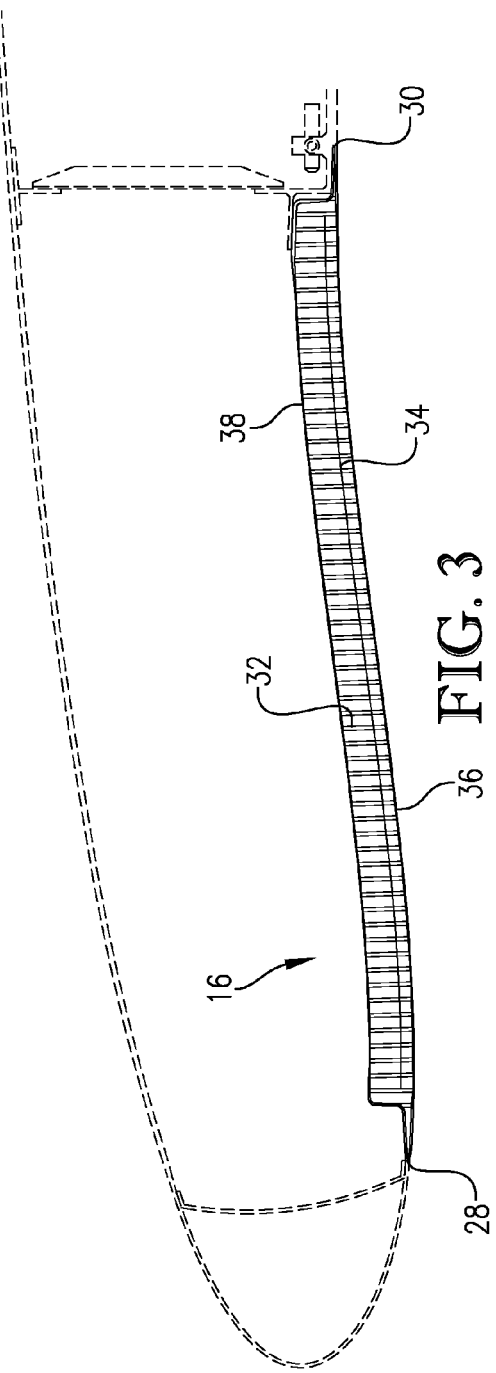

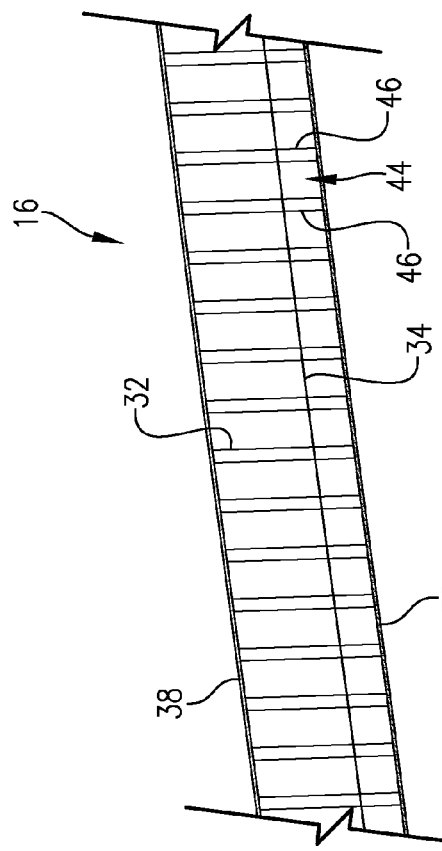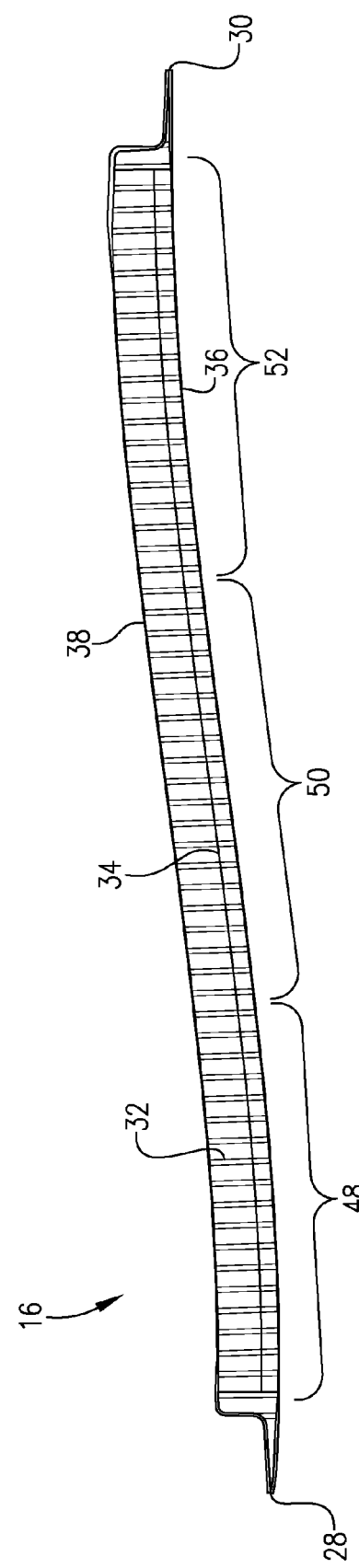

ENGINE INLET VARYING IMPEDANCE ACOUSTIC LINER SECTION

RELATED APPLICATIONS

This application claims priority benefit of a provisional application entitled, "Engine Inlet Varying Impedance Acoustic Liner Section," Ser. No. 61/560,997, filed Nov. 17, 2011 and incorporated by reference herein in its entirety.

BACKGROUND

Commercial and business jet aircrafts have engine inlets tailored for specific aerodynamic and acoustic design considerations. For example, some aircraft engine nacelle inlets or intake cowlings may include acoustic liners mounted therein to meet noise regulatory requirements. Typical inlet acoustic panels are designed with uniform impedance from an inlet forward bulkhead to an inlet aft bulkhead. This configuration does not always adequately absorb sound waves propagating within the inlet. As sound is attenuated in the inlet from a fan face forward toward the inlet, the uniform impedance is no longer optimum along the entire length of the inlet acoustic panel.

Therefore, there is a need for an improved method and apparatus for attenuating engine noise that overcomes the limitations of the prior art.

SUMMARY

Embodiments of the present invention solve the above-mentioned problems and provide a distinct advance in the art of aircraft engine noise attenuation. Specifically, embodiments of the present invention may provide an engine inlet of an aircraft engine nacelle configured for attenuating aircraft engine noise. The inlet may include an acoustic barrel panel, a septum, and a face sheet. The acoustic barrel panel may have an outer surface, an inner surface, a forward end, and an aft end. The septum may be sandwiched or buried within the acoustic barrel panel and may have a plurality of holes or perforations formed therein of varying areas and/or varying proximities relative to each other. The face sheet may be bonded to the inner surface of the acoustic barrel panel, spaced a distance apart from the septum, and may have a plurality of holes or perforations formed therein of varying areas and/or varying proximities relative to each other.

Another embodiment of the engine inlet may also include an acoustic barrel panel, a septum, and a face sheet. The acoustic barrel panel may have an outer surface, an inner surface, a forward end, and an aft end, and may be formed of a plurality of cell walls cooperatively forming an array of hexagonal shaped cells or openings therebetween. The septum may be sandwiched or buried within the acoustic barrel panel between the outer and inner surface and may have a plurality of holes formed therein having varying areas and varying proximities relative to each other depending on a proximity of the holes to the aft end of the acoustic barrel panel. The face sheet may be bonded to the inner surface of the acoustic barrel panel, spaced a distance apart from the septum, and may have a plurality of holes formed therein of varying areas and varying proximities relative to each other depending on a proximity of the holes to the aft end of the acoustic barrel panel.

Yet another embodiment of the engine inlet may include an inner acoustic panel, an outer barrel panel, a forward bulkhead, and an aft bulkhead. The inner acoustic panel may have a forward end and an aft end, and may include an acoustic barrel panel, a septum, and a face sheet. The acoustic barrel panel may have an outer surface, an inner surface, a forward end, and an aft end, as well as a plurality of cell walls cooperatively forming an array of hexagonal shaped cells or openings therebetween. The septum may be sandwiched or buried within the acoustic barrel panel between the outer and inner surface and may have a plurality of holes formed therein having varying areas and varying proximities relative to each other depending on a proximity of the holes to the aft end of the acoustic barrel panel. The face sheet may be bonded to the inner surface of the acoustic barrel panel, spaced a distance apart from the septum, and may have a plurality of holes formed therein of varying areas and varying proximities relative to each other depending on a proximity of the holes to the aft end of the acoustic barrel panel.

The outer barrel panel may have a forward end and an aft end, and the outer barrel panel may be spaced a distance apart from the inner acoustic panel. The forward bulkhead may join the forward end of the inner acoustic panel with the forward end of the outer barrel panel. The aft bulkhead may join the aft end of the inner acoustic panel with the aft end of the outer barrel panel. The outer barrel panel and/or the aft bulkhead may be configured to attach to a fan cowl of the aircraft engine nacelle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 2 is a cross-sectional view of the inlet of FIG. 1;

FIG. 3 is a cross-sectional view of an inner acoustic panel of the inlet of FIG. 1;

FIG. 4 is an enlarged vertical cross-sectional view of the inner acoustic panel of FIG. 3; and FIG. 5 is a vertical cross-sectional view of the inner acoustic panel of FIG. 3, identifying different impedance zones of a septum of the inner acoustic panel.

Figure 1:
FIG. 1 is a perspective view of a nacelle inlet constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

An inlet 10 of an aircraft engine nacelle 12 according to various embodiments of the present invention is illustrated in FIGS. 1 and 2. The inlet 10 may comprise an outer panel 14, an inner acoustic panel 16, a forward bulkhead 18, an aft bulkhead 20, and a lip skin 22. The outer panel 14 may have a forward end 24 and an aft end 26 and may be spaced a distance apart from the inner acoustic panel 16. The inner acoustic panel 16, best illustrated in FIGS. 3-5, may be an acoustic liner having a forward end 28 and an aft end 30 and may comprise an acoustic barrel panel 32 having an inner surface and an outer surface, a septum 34 buried or sandwiched within the acoustic barrel panel 32, a perforated face sheet 36 bonded on the inner surface of the acoustic barrel panel 32, and an impervious back sheet 38 bonded to the outer surface of the acoustic barrel panel 32. The inner acoustic panel may be located forward of an engine 40 and/or engine fan housed within the aircraft engine nacelle.

The forward bulkhead 18 may be configured to join the forward end 28 of the inner acoustic panel 16 with the forward end 24 of the outer panel 14. The aft bulkhead 20 may be configured to join the aft end 30 of the inner acoustic panel 16 with the aft end 26 of the outer panel 14. The outer panel 14 and/or the aft bulkhead 20 may be configured to attach to a fan cowl 42 of the aircraft engine nacelle 12, while the inner panel 16 and/or the aft bulkhead 20 may be configured to attach to the engine 40, as illustrated in FIG. 2. The lip skin 22 may be attached to and located forward of the forward bulkhead 18 and may have a curved configuration with an outer surface resting flush with outer surfaces of the outer panel 14 and the inner acoustic panel 16.

The acoustic barrel panel 32 may be formed of graphite epoxy composites or any material used in aircraft construction. The acoustic barrel panel 32 may be a curved or circular panel circumscribing or substantially circumscribing a duct axis of the aircraft engine nacelle 10. The acoustic barrel panel 32 may have a honeycomb configuration, with an array of hexagonal shaped cells 44 or openings cooperatively formed by and between cell walls 46 of the acoustic barrel panel 32, as illustrated in FIG. 4. Alternatively, the hexagonal shaped cells 44 may have other shapes and configurations sufficient to serve as resonator chambers of the inner acoustic panel 16.

The septum 34 may be a thin layer of material configured for substantially attenuating sound waves. For example, the septum 34 may comprise woven thermoplastic, metals, and/or cloth, among other suitable sound-attenuating materials. The septum 34 may be sandwiched between two portions of the acoustic barrel panel 32 or may be integrated into the acoustic barrel panel 32 at a location somewhere in between the outer and inner surfaces of the acoustic barrel panel 32 using a variety of manufacturing methods, such as those described in U.S. Pat. No. 7,998,389, incorporated herein by reference in its entirety. The septum 34 may traverse a plurality of the hexagonal shaped cells 44 at a location between the outer and inner surfaces of the acoustic barrel panel 32. A plurality of holes, openings, or perforations may be formed into the septum 34.

The perforated face sheet 36 and the impervious back sheet 38 may be made of graphite epoxy or any materials used in aircraft construction. The perforated face sheet 36 may have a plurality of holes, openings, or perforations formed therein, while the impervious back sheet 38 may be substantially impervious, without holes or perforations formed therein.

Both the septum 34 and the perforated face sheet 36 may have perforations or holes therein of varying sizes and varying distances apart from each other. In general, zones of higher resistance in the septum 34 and/or perforated face sheet 36 are manufactured by decreasing a percentage of open area (POA) therein. Specifically, the smaller the area of the perforations or holes and the further apart they are from each other, the smaller the percentage of open area and the higher the resistance of a given area of the septum 34 or the perforated face sheet 36. The resistance of the septum 34 and/or the perforated face sheet 36 may progressively increase in a direction away from the engine 40 or in a direction toward the engine 40. The holes or perforations in the septum 34 and/or the face sheet 36 may be arranged in an array of rows and columns. In some embodiments of the invention, the rows and/or columns may be staggered relative to adjacent rows and/or columns.

In some embodiments of the invention, the areas of the holes in the septum 34 and/or the face sheet 36 may decrease and/or the distance apart of the holes or perforations in the septum 34 relative to each other may progressively increase in a direction from the aft end 30 of the inner acoustic panel 16 toward the forward end 28 of the inner acoustic panel 16. Furthermore, in some embodiments of the invention, the septum 34 may be divided into two or more impedance zones. For example, three impedance zones 48,50,52 are illustrated in FIG. 5. The impedance zones that are closer to the aft end 30 of the acoustic inner panel 16 may have holes or perforations that are larger in area and/or closer in proximity to each other than the holes or perforations of impedance zones that are closer to the forward end 28 of the acoustic inner panel 16. Note that there could be any number of zones or a continually varying impedance in the septum 34 and/or the face sheet 36.

In one exemplary embodiment of the invention, acoustic impedance of the face sheet 36 may be substantially continuously variable from the forward end 28 to the aft end 30 of the acoustic inner panel 16, with a smaller percentage open area (e.g., approximately 6% POA) near the forward end than near the aft end (e.g., approximately 9% POA). The septum 34 may be divided into three difference impedance zones 48-52, including a forward septum impedance zone 48, a middle septum impedance zone 50, and an aft septum impedance zone 52. The forward septum impedance zone 48 may have an impedance higher than the other two zones (e.g., approximately 1.8% POA), the middle septum impedance zone 50 may have an impedance between impedances of the forward and aft septum impedance zones (e.g., approximately 2.15% POA), and the aft septum impedance zone 52 may have a lower impedance than the other two impedance zones (e.g., approximately 2.5% POA). In general, impedance should increase as the sound is attenuated. In some embodiments of the invention, both the septum impedance and the face sheet impedance may increase from an aft to forward direction. In other embodiments of the invention, the face sheet 36 may increase in impedance toward the forward end while keeping impedance of the septum 34 the same, or the face sheet impedance may be kept the same while increasing the septum impedance toward the forward end.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An aircraft engine nacelle inlet comprising:
   an acoustic barrel panel having an outer surface, an inner surface, a forward end, and an aft end;
   a septum sandwiched or buried within the acoustic barrel panel, wherein the septum has a plurality of holes formed therein of varying dimensional areas and/or varying proximities relative to each other; and
   a face sheet bonded to the inner surface of the acoustic barrel panel, spaced a distance apart from the septum, and having a plurality of holes formed therein of varying dimensional areas and/or varying proximities relative to each other,
   wherein acoustical impedance of at least one of the face sheet and the septum is incrementally increased in a direction from the aft end toward the forward end of the acoustic barrel panel by at least one of incrementally decreasing the dimensional areas of the holes and incrementally increasing the proximities of the holes relative to each other.

2. The inlet of claim 1, further comprising:
   an outer barrel panel having a forward end and an aft end, wherein the outer barrel panel is spaced a distance apart from the acoustic barrel panel;
   a forward bulkhead joining the forward end of the acoustic barrel panel with the forward end of the outer barrel panel, and
   an aft bulkhead joining the aft end of the acoustic barrel panel with the aft end of the outer barrel panel, wherein at least one of the outer barrel panel and the aft bulkhead is configured to attach to a fan cowl of the aircraft engine nacelle.

3. The inlet of claim 2, further comprising a lip skin attached to and located forward of the forward bulkhead.

4. The inlet of claim 1, further comprising an impervious back sheet bonded to the outer surface of the acoustic barrel panel.

5. The inlet of claim 1, wherein the acoustic barrel panel is a honeycomb acoustic panel having a plurality of cell walls cooperatively forming an array of hexagonal shaped cells or openings therebetween.

6. An aircraft engine nacelle inlet comprising:
   an acoustic barrel panel having an outer surface, an inner surface, a forward end, and an aft end, wherein the acoustic barrel panel further comprises a plurality of cell walls cooperatively forming an array of hexagonal shaped cells or openings therebetween;
   a septum sandwiched or buried within the acoustic barrel panel between the outer and inner surface, wherein the septum has a plurality of holes formed therein having varying dimensional areas and varying proximities relative to each other depending on a proximity of the holes to the aft end of the acoustic barrel panel; and
   a face sheet bonded to the inner surface of the acoustic barrel panel, spaced a distance apart from the septum, and having a plurality of holes formed therein of varying dimensional areas and varying proximities relative to each other depending on a proximity of the holes to the aft end of the acoustic barrel panel,
   wherein at least one of the dimensional areas of the holes in the face sheet incrementally decrease and the distance apart of the holes in the face sheet relative to each other incrementally increase in a direction from the aft end toward the forward end of the acoustic barrel panel, or
   wherein at least one of the dimensional areas of the holes in the septum incrementally decrease and the distance apart of the holes in the septum relative to each other incrementally increase in a direction from the aft end toward the forward end of the acoustic barrel panel.

7. The inlet of claim 6, further comprising:
   an outer barrel panel having a forward end and an aft end, wherein the outer barrel panel is spaced a distance apart from the acoustic barrel panel;
   a forward bulkhead joining the forward end of the acoustic barrel panel with the forward end of the outer barrel panel, and
   an aft bulkhead joining the aft end of the acoustic barrel panel with the aft end of the outer barrel panel, wherein at least one of the outer barrel panel and the aft bulkhead is configured to attach to a fan cowl of the aircraft engine nacelle.

8. The inlet of claim 6, wherein the septum is divided into two or more impedance zones, wherein the impedance zones closer to the aft end of the acoustic barrel panel have holes that are at least one of larger in dimensional area and closer in proximity to each other than the holes of the impedance zones closer to the forward end of the acoustic barrel panel.

9. An aircraft engine nacelle inlet comprising:
   an inner acoustic panel having a forward end and an aft end, the inner acoustic panel including:
      an acoustic barrel panel having an outer surface, an inner surface, a forward end, and an aft end, wherein the acoustic barrel panel further comprises a plurality of cell walls cooperatively forming an array of hexagonal shaped cells or openings therebetween,
      a septum sandwiched or buried within the acoustic barrel panel between the outer and inner surface, wherein the septum has a plurality of holes formed therein having varying areas and varying proximities relative to each other depending on a proximity of the holes to the aft end of the acoustic barrel panel, wherein at least one of the dimensional areas of the holes in the septum incrementally decrease and the distance apart of the holes in the septum relative to each other incrementally increase in a direction from the aft end toward the forward end of the acoustic barrel panel, and
      a face sheet bonded to the inner surface of the acoustic barrel panel, spaced a distance apart from the septum, and having a plurality of holes formed therein of varying areas and varying proximities relative to each other depending on a proximity of the holes to the aft end of the acoustic barrel panel;
   an outer barrel panel having a forward end and an aft end, wherein the outer barrel panel is spaced a distance apart from the inner acoustic panel;
   a forward bulkhead joining the forward end of the inner acoustic panel with the forward end of the outer barrel panel; and
   an aft bulkhead joining the aft end of the inner acoustic panel with the aft end of the outer barrel panel, wherein at least one of the outer barrel panel and the aft bulkhead is configured to attach to a fan cowl of the aircraft engine nacelle.

10. The inlet of claim 9, wherein at least one of the dimensional areas of the holes in the face sheet incrementally decrease and the distance apart of the holes in the face sheet relative to each other incrementally increase in a direction from the aft end toward the forward end of the acoustic barrel panel.

\* \* \* \* \*